US00RE50380E

(19) United States
(12) Reissued Patent
Ben Horin et al.

(10) Patent Number: US RE50,380 E
(45) Date of Reissued Patent: Apr. 15, 2025

(54) FILTRATION SYSTEM

(71) Applicant: AMIAD WATER SYSTEMS LTD, Upper Galil (IL)

(72) Inventors: Ra'anan Ben Horin, Kibbutz Bet Zera (IL); Kfir Atias, Ein Ya'akov (IL); Alex Zendel, Kiryat Motzkin (IL)

(73) Assignee: Amiad Water Systems LTD., Upper Galil (IL)

(21) Appl. No.: 18/096,382

(22) Filed: Jan. 12, 2023

Related U.S. Patent Documents

Reissue of:
(64) Patent No.: 11,040,299
Issued: Jun. 22, 2021
Appl. No.: 16/644,929
PCT Filed: Jan. 22, 2019
PCT No.: PCT/IL2019/050085
§ 371 (c)(1),
(2) Date: Mar. 5, 2020
PCT Pub. No.: WO2019/145943
PCT Pub. Date: Aug. 1, 2019

U.S. Applications:
(60) Provisional application No. 62/621,934, filed on Jan. 25, 2018.

(51) Int. Cl.
*B01D 29/66* (2006.01)
*B01D 29/15* (2006.01)
(Continued)

(52) U.S. Cl.
CPC ..... *B01D 29/668* (2013.01); *B01D 29/15* (2013.01); *B01D 29/52* (2013.01); *B01D 35/12* (2013.01);
(Continued)

(58) Field of Classification Search
CPC ..... B01D 29/66; B01D 29/15; B01D 29/668; B01D 29/52; B01D 35/15; B01D 2303/16;
(Continued)

(56) References Cited

U.S. PATENT DOCUMENTS 4,828,694 A 5/1989 Leason
4,862,914 A 9/1989 Weingarten
(Continued)

FOREIGN PATENT DOCUMENTS

AU 2012203034 A1 12/2012
CN 103090052 B 1/2016
(Continued)

OTHER PUBLICATIONS

Spin Klin, "Arkal Spin Klin 2 in. Battery Service & Maintenance Manual," Aug. 2013. (Year: 2013).*
(Continued)

*Primary Examiner* — Elizabeth L McKane
(74) *Attorney, Agent, or Firm* — Myers Wolin, LLC

(57) ABSTRACT

A filtration system is disclosed, which comprises a filtration-element within a filtration chamber, and a valving device located exteriorly to the filtration chamber, for reversing the direction of fluid-flow through the filtration-element for backwashing. The valving device thus functions as a common valve for handling both filtration and backwash. The common valve is based on a linearly-movable plug located inside a valve housing which is communicable with the filtration chamber, with a source of fluid to be filtered, and with evacuation port for backwash fluid, through three respective openings in the valve housing, and is characterized by an uninterrupted bend-free flow-channel extending at least from exteriorly to an inlet opening of the valve housing, to the body of the filtration-element whenever the common valve is in a filtration mode of operation.

62 Claims, 3 Drawing Sheets

(51) Int. Cl.

| | |
|---|---|
| ***B01D 29/52*** | (2006.01) |
| ***B01D 35/12*** | (2006.01) |
| ***C02F 1/00*** | (2023.01) |
| ***F16K 11/083*** | (2006.01) |
| ***F16K 11/085*** | (2006.01) |
| ***F16K 11/22*** | (2006.01) |

(52) U.S. Cl.
CPC ..... *C02F 1/001* (2013.01); *F16K 11/083* (2013.01); *F16K 11/085* (2013.01); *F16K 11/22* (2013.01); *B01D 2201/165* (2013.01); *C02F 2201/005* (2013.01); *C02F 2303/16* (2013.01)

(58) Field of Classification Search
CPC . B01D 2201/165; F16K 11/085; F16K 11/22; F16K 11/083; C02F 1/001; C02F 2201/005; C02F 2203/16
See application file for complete search history.

(56) References Cited

U.S. PATENT DOCUMENTS

| | | | | |
|---|---|---|---|---|
| 5,133,385 | A * | 7/1992 | Kawakami | F16K 11/085 137/625.43 |
| 9,056,267 | B2 | 6/2015 | Sasaki et al. | |
| 2004/0173510 | A1 | 9/2004 | Jung | |
| 2007/0074772 | A1* | 4/2007 | Yang | F16K 11/0856 137/625.46 |

FOREIGN PATENT DOCUMENTS

| | | |
|---|---|---|
| CN | 107387817 | 11/2017 |
| GB | 1504281 | 3/1978 |
| KR | 20130127831 A | 11/2013 |
| KR | 20130127832 A | 11/2013 |

OTHER PUBLICATIONS

Dorot, "Dorot Back Flushing Valves Product Catalogue," Apr. 2012 (Year: 2012).*
Arkal Spin Klin Disc Filtration Video, by water online, available: https://www.youtube.com/watch?v=dFS1tdwv3h0, Feb. 2013.
Disc Media Filters, by Netafim USA, available: https://www.youtube.com/watch?v=X66chc6oGA4, Sep. 2011.
Helix Automation AZUD, was available at: https://www.youtube.com/watch?v=ejVupHIQj5o, accessed Jan. 27, 2021.
Spin KlinTM animation movie EN, by Amiad Water Systems Filter, available: https://www.youtube.com/watch?v=eYn0PW4MFN0; Jan. 2013.
Dorot Control Valves Catalogue Edition, Apr. 2012, pp. 1-32.
How an AV210 normally closed (NC) angle seat valve works | Working animation, by: Danfoss Sensing Solutions, available: https://www.youtube.com/watch?v=9_6E9-h5HOE, Sep. 2013.
ABF animation movie EN, by Amiad Water Systems filters, available: https://www.youtube.com/watch?v=0daxYsr9oXE; Jan. 2013.
"700 Series Pressure Reducing Valve—Bermad model 720BXW Double Chamber Valve" Available Sep. 15, 2015, Retrieved from Internet: https://www.youtube.com/watch?v=2HBnHTWX2OU.
Amiad Water Systems "Arkal Spin Klin 2 inch Battery Service & Maintenance Manual", published on Aug. 2013 (Spin Klin).
The extended European search report with the European search opinion issued by the European Patent Office for European Patent Application No. 22169976.2, dated Oct. 5, 2022.
Dorot Control Valves, "Back-Flushing Valves," Back-Flushing Valves Catalogue, pp. 1-32, Apr. 2012.
Bermad, "700 Series Pressure Reducing Valve—Bermad model 720 BXW Double Chamber Valve," pp. 1-2, https://www.youtube.com/watch?v=2HBnHTWX2OU (screen shots 1 and 2), Sep. 15, 2015.
Amiad Water Systems, "Arkal Spin Klin 2" Battery Service and Maintenance Manual," pp. 1-14, http://www.amiad.com, Aug. 2013.

* cited by examiner

FILTRATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims the benefit of provisional patent application No. 62/621,934 filed Jan. 25, 2018, entitled "FILTRATION SYSTEM", which is hereby incorporated by reference in its entirety without giving rise to disavowment.

TECHNICAL FIELD

The present disclosure relates to the field of filtration systems in general, and to automated backflush of filtration systems, in particular.

BACKGROUND

Among the factors influencing the efficiency of backflush filtration systems is the amount of liquid, for example fresh water in a water filtration system, wasted in performing the backflush. For objective estimation of the system performances, liquid loss can be measured as a percentage of the total amount of liquid treated by the system.

Another efficiency influencing factor is the amount of kinetic energy lost by the liquid while flowing between the inlet and the outlet of the system during filtration mode of operation (which lost typically worsens during backflush mode). The higher the energy losses are, more powerful pumping is required for maintaining a desired flow rate at the system outlet. Pumping power is costly in terms of the pump model to be used, its power consumption, and sometimes also the physical deterioration of the piping components and fittings used under excessive pressures between the pump and the filtration system.

BRIEF SUMMARY

One exemplary embodiment of the disclosed subject matter is a filtration system comprising: a filtration chamber, a filtration-element housed within the filtration chamber, wherein the filtration-element comprises a body of the filtration-element, a common valve comprising a valve housing in fluid communication with the filtration chamber, with a source of fluid to be filtered, and with evacuation port for backflush fluid, through three respective openings in the valve housing, wherein the common valve, the filtration chamber, and a tube segment connecting therebetween, are mutually configured to provide for an uninterrupted bend-free flow-channel extending at least from exteriorly to an inlet opening of the common valve, to the body of the filtration-element whenever the common valve is in a filtration mode of operation.

In some exemplary embodiments, the inlet opening of the common valve may be the most exterior opening in the body of the valve housing itself (i.e. after removal of any removable pipe sections that may connect between the common valve and a source of raw fluid).

In various embodiments of the presently disclosed subject matter, the bend-free flow-channel has a cross section area perpendicularly to a longitudinal axis thereof of about 50% or more of the area of the inlet opening of the common valve.

In various embodiments of the presently disclosed subject matter, the common valve comprises a plug that is linearly movable within a central void of the common valve, wherein a backwall of the plug has a protrusion substantially fitting within a matching immovable recess, wherein the matching immovable recess extends between an evacuation-outlet formed in a wall of the valve housing and between the central void and has an internal free space having a predetermined volume, wherein said protrusion is configured to at least partially occupy the internal free space when the plug is in transition, between a backmost position of the plug within the void and a position closer to a foremost position of the plug within the void until full departure of the protrusion out from within the immovable recess, thereby reducing evacuation of fluid through the immovable recess during transition of the plug between a filtration mode of operation and a backflush mode of operation as a function of a degree of a volume of the recess, occupied by the rear protrusion.

In various embodiments of the presently disclosed subject matter, the common valve comprises a plug that is linearly movable between a first position and a second position, wherein the first position is associated with a filtration mode of operation, wherein the second position is associated with a backflush mode of operation, wherein the plug comprises a rear protrusion configured to restrict fluid passage from a central void of the valve to the evacuation port during linear motion of the plug from the first position to the second position, wherein at least a portion of a predetermined volume of the recess is occupied by the rear protrusion for at least first 30% of full extent of the linear motion whereby waste of fluid through the evacuation port is reduced as a function of a degree of a volume of the recess occupied by the rear protrusion.

In various embodiments of the presently disclosed subject matter, the rear protrusion is cylindrical, a height of which is oriented parallel to a direction of the linear motion.

In various embodiments of the presently disclosed subject matter, the common valve comprises a plug that is linearly movable between a first position and a second position, wherein the first position is associated with a filtration mode of operation, wherein the second position is associated with a backflush mode of operation, wherein the plug comprises a front protrusion configured to enter the inlet opening for thereby reducing a flow rate of fluid into the inlet opening during linear motion of the plug from the first position to the second position, wherein at least a portion of the front protrusion penetrates through the inlet opening for at least last 30% of full extent of the linear motion, whereby waste of fluid through the evacuation port is reduced as a function of a degree of penetration of the front protrusion through the inlet opening.

In various embodiments of the presently disclosed subject matter, the front protrusion is tapering towards the inlet opening, e.g. is conically like.

In various embodiments of the presently disclosed subject matter, an angle between a longitudinal axis of the tube segment and a longitudinal axis of the filtration chamber is between 35 and 55 degrees.

In various embodiments of the presently disclosed subject matter, the tube segment has an elliptically shaped cross section perpendicularly to its longitudinal axis, flattened in a direction parallel to the direction of linear motion, thereby allowing for a shortening the extent of linear motion of the plug per a given cross section area of the tube segment.

In various embodiments of the presently disclosed subject matter, a proximal end of the filtration chamber, at least most of the housing of the common valve and the tube segment are inseparable members of a single piece of material.

In various embodiments of the presently disclosed subject matter, a flow through a first opening in a housing of the filtration chamber is into the chamber during filtration mode of operation and out of the chamber during backflush mode of operation, wherein a flow through a second opening in a housing of the filtration chamber is out of the chamber during filtration mode of operation and into the chamber during backflush mode of operation.

Another exemplary embodiment of the disclosed subject matter, is a twin filtration system, comprising a first and a second filtration systems, each according to said first exemplary embodiment, or according to any of the variations embodiments that follow. Said first and second filtration systems, are connected together in a mirroring configuration, wherein the inlet opening of the common valve in the first system is facing the and having a line of sight with the inlet opening of the common valve in the second system through a flow splitter for a fluid to be filtered.

In various embodiments of the presently disclosed subject matter, the flow splitter comprises a pair of arched tubes diverging from a central common tube.

In various embodiments of the presently disclosed subject matter, said first and second filtration systems are connected together in mirroring configuration, wherein an outlet opening of the filtration chamber in the first system is facing the and having a line of sight with an outlet opening of the filtration chamber in the second system through a flow combiner for a filtered fluid.

In various embodiments of the presently disclosed subject matter, the flow combiner comprises a pair of arched tubes diverging from a central common tube.

In various embodiments of the presently disclosed subject matter, a radius of a largest inner curve of each of the arched tubes is between about 100% and 150% the diameter of the central common tube.

In various embodiments of the presently disclosed subject matter, an inner cross section area of a central common tube of the flow splitter or the flow combiner is closely equal an inner cross section area of any one of the tubes diverging from the common central tube.

One general aspect of the presently disclosed subject matter, is a valving device having a linearly movable plug for selecting between a first flow path and a second flow path corresponding to a first and a second extreme positions of the linearly movable plug, and constituting a common valve, the valving device comprises a housing, the plug that is linearly movable within the housing between said first and second extreme positions, a permanently-open port common to the first flow path and the second flow path, a first port having an outer opening in fluid communication with the permanently open port when the plug is in the first of the extreme positions, a second port having fluid communication with the permanently open port when the plug is in the second of the extreme positions, wherein when the plug is in the first of the extreme positions, fluid communication between the outer opening and the permanently open port comprises a linear flow-path having a transvers cross section area greater than 50% the area of the outer opening, constituting an uninterrupted bend-free flow-channel extending at least from exteriorly to the outer opening to exteriorly to the permanently-open port.

In various embodiments of the presently disclosed subject matter, transvers cross section area of the linear flow-path is greater than 75% the area of the outer opening.

In various embodiments of the presently disclosed subject matter, the permanently-open port has a predetermined open area in a plane, parallel to a linear direction of motion of the plug, wherein the open area has a minor axis defining a width of the bidirectional port on the plane and a major axis defining a length of the bidirectional port on the plane, wherein the width is smaller than the length, wherein the minor axis and correspondingly the width of the bidirectional port on the plane is parallel or closely parallel to the direction of motion of the plug.

In various embodiments of the presently disclosed subject matter, a backwall of the plug has a protrusion substantially fitting within a matching immovable recess, wherein the matching immovable recess extends between the second port and between a central void of the valving device, wherein said protrusion is configured to block or substantially restrict flow of fluid from the central void to the second port when the plug is in transition between a backmost position within the void and a position substantially close to its foremost position within the void, wherein the backmost position may be associated with a filtration mode of operation of a self-cleaning filtration system, wherein the foremost position may be associated with a backflush mode of operation of the self-cleaning filtration system, thereby allowing to reduce evacuation of fluid during transition of the plug once configured to change a mode of operation from the filtration mode of operation to the backflush mode of operation.

In various embodiments of the presently disclosed subject matter, the first of the extreme positions may be associated with a filtration mode of operation of a self-cleaning filtration system, wherein the second of the extreme positions may be associated with a backflush mode of operation of the self-cleaning filtration system, wherein the plug comprises a front protrusion configured to enter the outer opening for thereby reducing flow rate of fluid into the first port during linear motion of the plug from the first of the extreme positions to the second of the extreme positions, for at least last 30% of a full extent of a linear movability of the plug between the first and second extreme positions, whereby waste of fluid through the second port is reduced as a function of a degree of penetration of the front protrusion through the outer opening.

In various embodiments of the presently disclosed subject matter, a backwall of the plug has a protrusion substantially fitting within a matching immovable recess, wherein the matching immovable recess extends between the second port and between a central void of the valving device, wherein said protrusion is configured to block or substantially restrict flow of fluid from the central void to the second port when the plug is in transition between a backmost position within the void and a position substantially close to its foremost position within the void; wherein the plug further comprises a front protrusion configured to enter the outer opening for thereby reducing flow rate of fluid into the first port during linear motion of the plug from the first of the extreme positions to the second of the extreme positions, for at least last 30% of a full extent of a linear movability of the plug between the first and second extreme positions; and wherein the backmost position may be associated with a filtration mode of operation of a self-cleaning filtration system, wherein the foremost position may be associated with a backflush mode of operation of the self-cleaning filtration system, thereby allowing to reduce evacuation of fluid during transition of the plug once configured to change a mode of operation from the filtration mode of operation to the backflush mode of operation, as a function of a degree of a volume of the recess occupied by the rear protrusion and a degree of penetration of the front protrusion through the outer opening.

In various embodiments of the presently disclosed subject matter, at least for 50% of the full extent of linear movability of the plug between the first and second extreme positions, either the rear protrusion occupies a volume of the recess or the front protrusion penetrates through the outer opening.

In various embodiments of the presently disclosed subject matter, a distance between a frontal end of the front protrusion and a posterior end of the rear protrusion is greater than 80% a distance between a frontal end of the recess and the outer opening.

In various embodiments of the presently disclosed subject matter, a distance between a frontal end of the front protrusion and a posterior end of the rear protrusion is equal to or greater than a distance between a frontal end of the recess and the outer opening.

Another general aspect of the presently disclosed subject matter, is a filtration system member, comprising in one inseparable piece a portion of filtration chamber housing, a portion of a housing of a common valve located exteriorly to and remotely from the portion of filtration-chamber housing, and a tube segment connecting therebetween, wherein the portion of filtration chamber housing, the portion of a housing of the common valve, and the tube segment, are mutually configured to provide for an uninterrupted bend-free flow-channel extending at least from exteriorly to an inlet opening of the common valve, to interiorly of the portion of filtration chamber housing.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
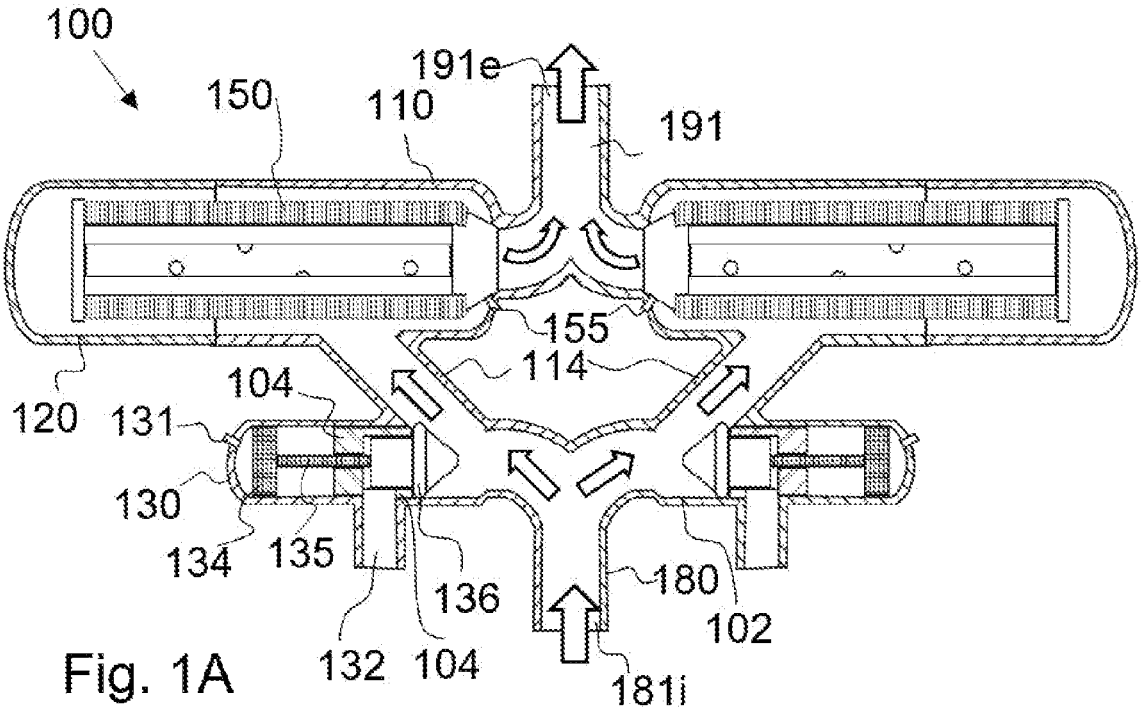
FIG. 1A illustrates a cross sectional view of a pair of automatic-backflush filtration assemblies, shown operating in mirroring configuration during a filtration-only mode of operation, according to the presently disclosed subject matter.

In view of the foregoing, it is among the objects of the following disclosure to provide guidelines as to how to build filtration systems that will be more efficient from analogous state of the art systems which make use of similar filtration-elements, in terms of both: the amount of liquid wasted for cleaning the filters, and the amount of kinetic energy lost by the body of liquid flowing between the inlet and the outlet of the system during filtration mode of operation (which lost typically worsens during a backflush session). Energy loss through a filtration system is associated with a drop in the hydraulic pressure between the inlet and the outlet of the system.

Temporal drop in the liquid pressure at the outlet of a backflush filtration system will normally occur during a backflush session (additionally to the regular drop during a filtration-only mode of operation), since the contribution of the filter undergoing the cleaning in real-time is subtracted from the regular filtration capacity of the system, and further since the system consumes a portion of its output for the flushing.

It is therefore among the objects of the disclosure to reduce the pressure drop between inlet and outlet of a filtration system in both modes of operation, and to reduce its severity during a backflush session.

Additional objects will become apparent from the description and the drawings of the disclosed embodiments.

Certain loss in the amount of kinetic energy of the body of liquid flowing through automatic backflush filters is caused by the valving arrangement. A valving arrangement may be required in automatic backflush filters for routing the liquid in the appropriate direction through the system, based on the currently intended mode of operation: filtration, or backflush. For the filtration, the valving arrangement routes unfiltered liquid from the filter's inlet, through the filter's filtration-element, to the filter's outlet. For the backflush, the valving arrangement reverses the liquid-flow through the filter's filtration-element, by routing clean liquid from the outlet, through the filtration-element undergoing a cleaning session by the backflush, to a dirty-liquid evacuation-outlet.

Accordingly, one problem associated with backflush filtration systems is pressure loss associated with the system's valving arrangement.

Another problem associated with backflush filtration systems is liquid loss during backflush sessions.

One object of the presently disclosed subject matter is to reduce pressure loss between the inlet and the outlet of an automatic backflush filter, in comparison with the pressure loss over a candidate backflush filter. In the present context, a candidate backflush filter is an automatic backflush filter having identical filtration-element and working under similar external conditions, while lacking the presently disclosed solutions.

Another object of the presently disclosed subject matter is to reduce the amount of liquid wasted for carrying out the automatic filter-cleaning process.

Some solutions disclosed hereinafter may reduce the losses associated with both problems commonly.

A drain valve may be used for providing automatic backflush filters with said reversal in the direction of fluid-flow through a backflush filter during its flushing mode. Simultaneously, the flow of raw fluid to be filtered through the filter to undergo the backflush may be stopped by a main flow valve. Said drain valve and said main flow valve may be combined into a single valving device, referred to also as a 'common valve', which is a valve common for controlling both the backflush and the main-flow. A first solution according to the presently disclosed subject matter is aimed to reduce the resistance to liquid-flow along the route to be followed by the body of liquid from exteriorly to the opening of an inlet port for raw fluid of a common valve to the body of a filtration-element.

One general aspect of the presently disclosed subject matter concerns a valving device having a linearly movable plug for selecting between a first flow path and a second flow path corresponding to a first and a second extreme positions of the linearly movable plug and constituting a common valve. According to the presently disclosed subject matter, the valving device comprises a housing, a plug that is linearly movable within the housing between said first and second extreme positions, a permanently-open port common to the first flow path and the second flow path, a first port having an outer opening in fluid communication with the permanently open port when the plug is in the first of the extreme positions, a second port having fluid communication with the permanently open port when the plug is in the second of the extreme positions, wherein when the plug is in the first of the extreme positions, fluid communication between the outer opening and the permanently open port comprises a linear flow-path having a transvers cross section area greater than 50% the area of the outer opening, constituting an uninterrupted bend-free flow-channel extending at least from exteriorly to the outer opening to exteriorly to the permanently-open port.

A valving device according to said broad aspect may be used in any desired industrial application in which a linearly movable plug may be preferred for selecting between a first and a second flow paths through a permanently open port, and which can accept partial fluid communication between the first and the second flow paths when the plug is in transition. The valving device may be especially useful for filtration systems in which cleaning of the filters is by hydraulic mechanism configured to backwash the filtrating media.

In various embodiments of the presently disclosed subject matter the filtrating-media is a disc-filter, a media filter, or the like. However, the disclosed subject matter is not limited to filtration-elements of specific types. Filtration devices and screening devices of any filtration or screening technique may be employed.

In one exemplary embodiment of the disclosed subject matter, the filtration-element is coupled to a bottom end of a filtration chamber's housing, said bottom end constituting a proximal portion of the filtration chamber. Supply of pressurized liquid to be filtered, to the filtration chamber, is from a bidirectional port of a common valve. The bidirectional port functions as an outlet of the common valve during a filtration mode of operation, and as an inlet of the common valve during backflush sessions. In various embodiments of the disclosed subject matter the solution includes that during the filtration mode of operation the common valve, the chamber's housing and a tube connecting therebetween, are mutually configured to provide for an uninterrupted bend-free flow-channel extending at least from exteriorly to an inlet-opening of the common valve, through the bidirectional port of the valve to the body of the filtration-element. Accordingly, the common valve may be of a particular design, providing for uninterrupted bend-free fluid path from its inlet opening to its bidirectional port. In various embodiments of the disclosed subject matter, the inlet opening of the common valve is an opening located at an interfacing end of the common valve's housing, by which the common valve is couplable to a source of the fluid to be filtered. In various embodiments of the disclosed subject matter, the bidirectional port of the common valve may be an opening located at an interfacing end of the valve's housing, by which the valve's housing is couplable to, or is integrated with, a tube segment providing for uninterrupted bend-free flow channel portion from the bidirectional port to an opening of the filtration chamber facing the filtration-element, wherein a longitudinal axis of the uninterrupted bend-free flow channel portion is substantially (i.e. with no more than 15 degrees deviation) overlapping in direction, with a longitudinal axis of the uninterrupted bend-free fluid path through the common valve. Liquid can thus flow during a filtration mode of operation straight from before the common valve to the filtration-element, thus minimizing loss of kinetic energy along this portion of the flow from inlet to outlet of the filtration system.

In various embodiments the bend-free flow-channel has a cross section area perpendicularly to a longitudinal axis thereof of about 50% or more of the area of the inlet-only opening of the common valve. In some embodiments, the section area of the bend-free flow-channel perpendicularly to a longitudinal axis thereof is more than about 75% or of the area of the inlet-only opening of the common valve.

In various embodiments the chamber's housing, a hollow body of the common valve in which said inlet opening and the bidirectional port are formed, and a tube providing for liquid communication between the chamber's housing and the bidirectional port, are all formed as inseparable members of a single piece of material constituting a core-unit of the backflush filtration unit according to the presently disclosed subject matter.

In some embodiments of the disclosed subject matter the core-unit structure is configured to lack handedness, thus allowing mirroring symmetry of the filtration system, with the same core-unit structure serving in either side of a dual filtration assembly.

In various embodiments of the presently disclosed subject matter, the common valve comprises a hydraulic or pneumatic piston-driven plug, wherein a backwall of the plug facing toward the piston has a protrusion substantially fitting within a matching recess (wherein substantial fitting is when a cross section area of the protrusion is grater than 70%, and preferably between 95% and 99.9%, of cross sectional area of the recess when the protrusion is within the recess and both said cross section areas share a common plane within the recess, transversely to a direction of linear movability of the plug), wherein the recess extends between an evacuation-outlet formed in a wall of the valve and between a central void of the valve, wherein said backwall protrusion blocks or substantially restricts flow of liquid from the central void to the evacuation-outlet when the plug is in transition, driven by the piston between its backmost position within the void and a position substantially close to its foremost position within the void, thereby minimizing evacuation of liquid during transition of the plug between a filtration mode of operation and a backflush mode of operation.

In various embodiments of the presently disclosed subject matter, the common valve comprises a hydraulic or pneumatic piston-driven plug, wherein a front wall of the plug facing away from the piston comprises a convexity protruding away from the plunger, said convexity protrudes through an inlet opening of the valve when the plug comes closer to its foremost position, thereby minimizing entrance of liquid through the inlet closely before becoming completely plugged. In some embodiments, the convexity has a conical shape, thereby minimizing disturbance to liquid flow through the valve during filtration mode of operation.

Figure 1B:
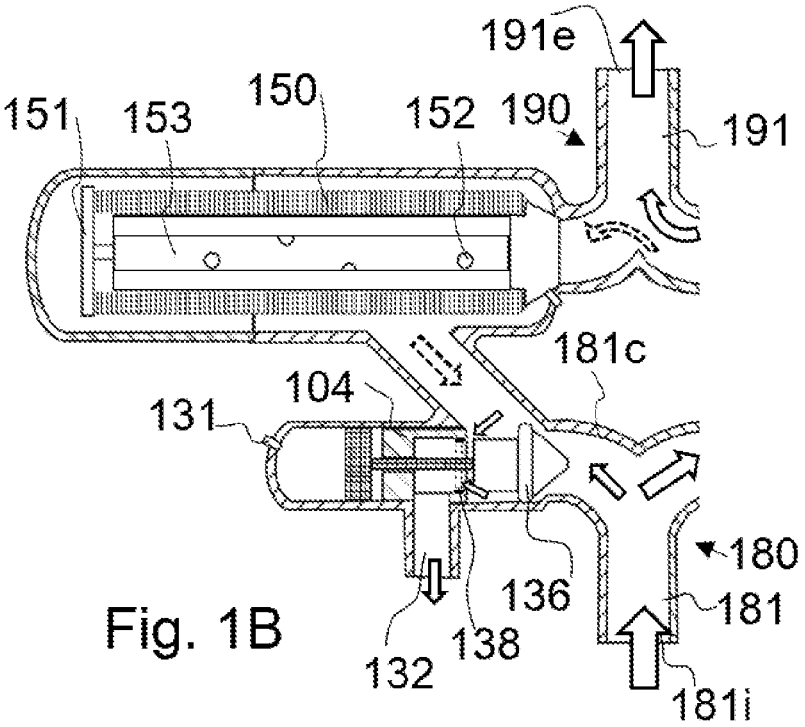
FIG. 1B illustrates the left half of the pair of assemblies of FIG. 1A, in a state of transition from a filtration mode of operation to a backflush mode of operation.
Figure 1C:
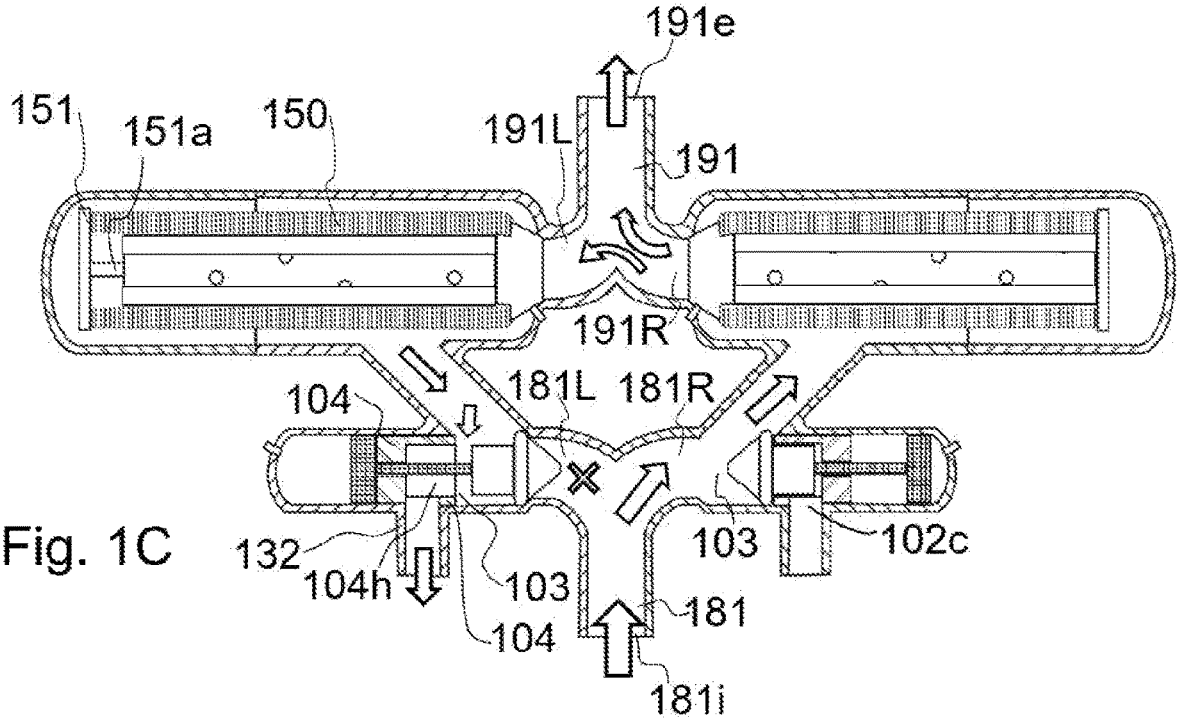
FIG. 1C illustrates the pair of assemblies of FIG. 1A, during a backflush mode of operation with the filtration-element of the left-side assembly being flushed by a reverse flow of filtered liquid supplied from the right side assembly.

FIGS. 1A to 1C illustrate, respectively, three lateral cross-section views of an exemplary embodiment of a backflush filtration twin unit 100 (referred to also as dual filtration assembly), in three of its different operation states. The three figures thus differ in the position of a piston-driven plug-wall 136 of the common valve 102 of the left-side filtration assembly, and in the resultant directions of liquid flows through the unit, resembled by respective arrows illustrated within the involved tubes and valves.

In various embodiments, the backflush filtration twin unit 100 is served by two identical filtration chambers 110. In the illustrated embodiments, the chambers are positioned in a mirroring configuration and share a common longitudinal axis, wherein the openings at their proximal ends are facing, and the proximal ends are coupled, respectively to the lateral tube segments 191L and 191R of a T or of a Y fitting constituting a flow combiner 190, wherein a central tube 191 of the combiner constitutes an outlet tube of the backflush filtration twin unit 100.

It is noted, however, that some of the solutions according to the presently disclosed subject matter do not require that backflush filtration assemblies and/or the filtration chamber of each will be connected in a mirroring configuration. More specifically, solutions which refer to the structure of the common valve 102 and of any internal components thereof, and/or to the core-unit 101 and any internal components thereof, do not necessarily require that the filtration unit in which they are immediately installed will be installed in a mirroring relationship with a counterpart filtration unit (or units) with which it cooperates for establishing automatic backflush sessions.

According to a first broad aspect of the presently disclosed subject matter, a reduction in resistance to the liquid-flow is achieved by providing a valve (referred to also 'common valve') comprising (i) a hollow body 102 having at least three openings 102a, 102b and 102c (annotated in FIG. 1E), through which liquid can flow between a void 103 of the body 102 and three respective environments external to the body; (ii) a plunger 135 (in the present disclosure referred to also as 'stem') having a plug 136 connected at a first end thereof, said plug 136 is movable by the plunger 135 within the void 103 between a foremost position (shown in the left assembly of FIG. 1C) in which it blocks liquid passage between the void 103 and a first (102a) of said at least three openings, and between a rearmost position (shown e.g. in both assemblies of FIG. 1A) in which it blocks liquid passage between the void 103 and a third (103c) of said at least three openings; wherein liquid communication between the void 103 and the second (102b) of the at least three openings is uninterruptable by the plug 136.

Figure 1D:
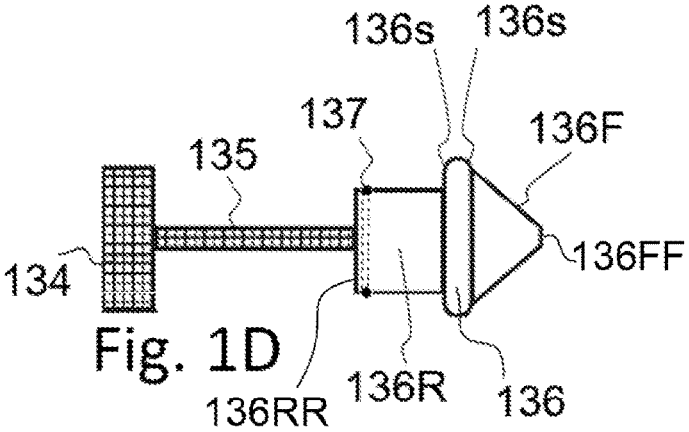
FIG. 1D illustrates an enlarged view of a plug of a common valve taken from the filtration assemblies of FIG. 1A.

In various embodiments of the disclosed subject matter, said plug 136 comprises at least one of a front facing and a rear facing ring-like sealing-regions (annotated 136s in FIG. 1D). In various embodiments of the disclosed subject matter, the first (102a) of said at least three openings is encompassed by a ring-like recess (annotated 106 in FIG. 1E) having a contour matching said front facing ring-like sealing region 136s of the plug.

In the context of the present disclosure the 'inlet' of a common valve is an opening in a housing of the valve, constituting or corresponding to the opening 102a, through which the valve is in liquid communication with a supply of pressurized liquid to be filtered. The inlet may comprise coupling means (not illustrated) by which it can be releasably couplable to an inlet tubing (e.g. Y fitting 180).

In the context of the present disclosure the 'outlet' of a common valve is an opening in a housing of the valve, constituting or corresponding to the opening 102b, through which the valve is in liquid communication with a filtration-element or a screening-element, such as the disc filter 150 (referred to herein also as a 'disc filtration-element'). The liquid communication between the common valve and the filtration-element is bidirectional. In some exemplary embodiments, during a backflush session the fluid flow through the opening 102b is reversed. Accordingly, the outlet 102b of the valve, may also be referred to in the context of the present disclosure as a 'bidirectional port' of the common valve.

In the context of the present disclosure, the 'evacuation-outlet' of a common valve is an opening in a housing of the valve, constituting or corresponding to the opening 102c, through which the valve can be in liquid communication with a draining system, or through which it is open to the atmosphere.

In various embodiments of the disclosed subject matter, the valve comprises a ring-like recess having a contour matching said rear facing ring-like sealing region 136s of the plug, located at the rearmost position of the rear sealing region and configured to engage with the rear sealing region 136s for sealing against liquid passage from the void 103 to the evacuation-outlet 103c when the plug 136 is in its rearmost position. In the illustrated embodiment, the evacuation-outlet 103c is blocked by the backside of wall 136 of the plug, without relying on the rear facing ring-like sealing 136s, therefore no ring-like recess of a matching contour is illustrated at the rearmost position of the plug.

According to a second broad aspect of the presently disclosed subject matter, a reduction in the liquid wasted during transitions of the plug 136 between its rearmost and foremost positions is achieved by providing the rear-facing wall of the plug with a convexity (a protruding portion) bulging towards the plunger, wherein said convexity protrudes through a recess or opening 104h when the plug comes closer to the its rearmost position. In various embodiments the convexity of the rear facing wall resembles a cylindrical shape 136R. In some embodiments, the cylindrical protrusion 136R and the plunger 135 share a common axis of symmetry.

Further according to said second broad aspect, in various embodiments of the disclosed subject matter, a front-facing wall of the plug comprises a convexity 136F protruding away from the plunger 135, said convexity protrudes through the first opening 102a when the plug 136 comes closer to its foremost position.

In various embodiments the convexity of the front facing wall 136F resembles a cone shape. In some embodiments, the cone shape protrusion 136F and the plunger 135 share a common axis of symmetry.

In various embodiments of the disclosed subject matter, said second opening 102b is connected to the filtration chamber by an outlet tube member 114.

Figure 1E:
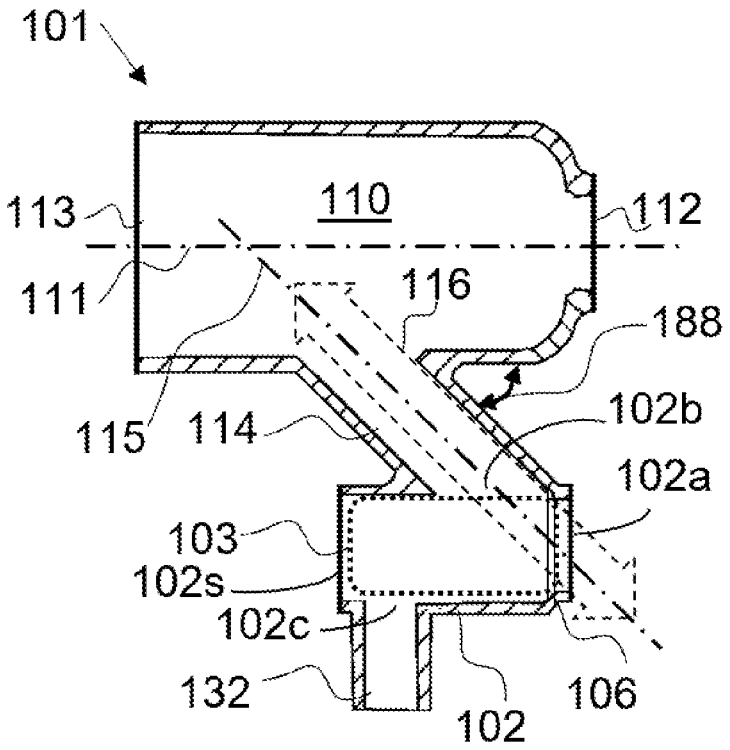
FIG. 1E illustrates an annotated explanatory view of a core-unit of a housing of a filtration assembly according to the presently disclosed subject matter.

In various embodiments of the disclosed subject matter, the hollow body of the valve 102, the outlet tube member 114 and a body 110 of the filtration chamber are formed as an inseparable single-piece unit 101, referred to also as 'core-unit', as schemed in FIG. 1E. In various embodiments of the disclosed subject matter, the cylinder housing 130 is removably attachable to the hollow body 102 at a service opening 102s. The attachment between the housing 130 may be secured to the opening 102s of the hollow body 102 by any acceptable coupling means. In some embodiments the attachment between the hollow body 102 and the cylinder housing 130 is by means of a coupling-clamp. In other embodiments the connection may be by mutually bolted flanges, or by mutual threading. In various embodiments of the disclosed subject matter the body of the filtration chamber has a service opening 113 removably covered by the chamber's housing cover 120.

In various embodiments of the disclosed subject matter a longitudinal axis 115 of the outlet tube member 114 forms with a longitudinal axis 111 of the filtration chamber an angle of between 35 and 55 degrees.

In some embodiments of the disclosed subject matter the longitudinal axis 115 of the outlet tube member 114 forms with the longitudinal axis 111 of the filtration chamber an angle of about 45 degrees.

In the present disclosure when referring to the angle between the longitudinal axis 115 of the tube member 114 and the longitudinal axis 111 of the filtration chamber, the angle concerned is the sharp-angle between the axes, which is closer to the proximal end 112 of the chamber housing 110, i.e. (in embodiments in which the axes are parallel to the respective wall sections) the angle between the axes which is equal and parallel the angle marked by the curved arrow 188 between the wall of the housing 110 and the wall of the tube 114.

Referring back to said first broad aspect, in various embodiments of the disclosed subject matter, the filtration chamber 110 and said first and second openings 102a and 102b of the common valve 102 are arranged such that an uninterrupted bend-free flow-channel (demonstrated in FIG. 1E between the parallel dashed lines of arrow 116) passes through all, thereby minimizing change in direction and turbulent flow of a body of liquid flowing from exteriorly to the first opening 102a, to the chamber 110.

In various embodiments of the disclosed subject matter, a cross-section area of the flow channel 116 measured transversely to the axis 115 and defined by the mutually remoter parallel sightlines extending between the filter (filtration-element) 150 and the outer side of the opening 102a, is 75% or more of the cross-section area of the outlet tube member 114.

In various embodiments of the disclosed subject matter the flow channel 116 is substantially parallel to the longitudinal axis 115 of the outlet tube 114.

In various embodiments of the disclosed subject matter the cross section of the tube 114 transversely to its axis 115, is substantially oval. In various embodiments the cross section of the tube 114 transversely to its axis 115, is lengthy in a direction perpendicularly to the plane of the figures than in the direction parallel to the plane of the figures (e.g. due to ovality of the cross section), thereby allowing to shorten the stroke of the piston 134, and hence the distance between the two extreme positions of the plug 136, per a given cross sectional area of the tube member 114. This may reduce the transition time of the plug between the filtration and cleaning sessions, and further reduce the liquid loss associated with the transition.

In various embodiments of the disclosed subject matter, an inner cross section area of the common inlet tube segment 181, is substantially equal to an inner cross section area of either of the left and the right segments 181L and 181R diverging thereof, said areas being measured transversely to the direction of a respectively intended liquid-flow.

In various embodiments of the disclosed subject matter, the segments 181L and 181R are arched. In some embodiments a radius of the largest inner curve thereof (annotated 181c in FIG. 1B) is between about 100% and 150% the diameter of the tube 181. In various embodiments of the disclosed subject matter, said first opening 102a is connected by the inlet tube member 181 to an inlet fitting (such as a flange) configured for connection (e.g. by bolts) to a matching outlet fitting of a main tube (not illustrated) from which pressurized liquid can be supplied through the valve 102 to the filtration chamber 110.

Since the route to be followed by a body of liquid from the inlet tube to the outlet tube of the presently disclosed automatic backflush filtration system is less labyrinthine in comparison to the route followed by the body of liquid through competing systems having valving arrangement lacking the presently disclosed solutions, the pressure loss between the liquid inlet 181i and the liquid outlet 191e of the twin unit 100 according to the presently disclosed subject matter will be reduced, thereby minimizing the total drop in the hydraulic pressure across a filtration system comprising a battery of twin units 100.

The backflush filtration unit 100 comprises a pair of automatic backflush filtration assemblies connected in mirroring configuration. Each of the assemblies comprises a filtration chamber formed of a proximal housing 110 and a cover 120.

The chamber's housing 110 and its cover 120 may be secured together by any acceptable coupling means that allow facile removal of the cover, e.g. for service purposes. In some embodiments they are secured together by a coupling clamp and its prescribed gasket/s.

Referring now in more detail to the operation of the unit 100, the disc filtration-element 150 is secured inside the chamber to a bottom end of the chamber's housing 110. The chamber's housing 110 is in liquid communication with the common valve through a diagonal tube 114.

The common valve comprises a hollow body 102 and a piston-driven plug 136 connected to a piston 134 by a piston stem 135. The piston is movable through a piston cylinder 130, as a result of changes in the fluid pressure inside the cylinder. The fluid for controlling the piston (and consequently the plug) is communicated to the cylinder from an external fluid source (not illustrated), through the control port 131.

In some embodiments the fluid for controlling the piston is liquid of the type undergoing the filtration and is supplied, e.g. after filtration through a secondary filter (not illustrated), while gaining a required pressure through a controller activated booster (not illustrated).

A recessed bushing 104 has a hole for the stem 135, and is secured between the void 103 of the valve and between the cylinder 130 for isolating therebetween against fluid exchanging.

A front end of the bushing 104 (and in various other embodiments an additional bushing located next to the first) cooperates with the plug 136 in preventing liquid leakage from the void 103 to the evacuation-port 103c. In the illustrated embodiment the bushing 104 has a cylindrical recess 104h configured for receiving a matching cylindrical extension 136R protruding from a rear wall of the plug 136. The recess is opened to an evacuation-opening 102c formed in the hollow body of the valve 102. Liquid communication will thus be provided from the void 103 of the valve, to the evacuation-opening 102c through the recess 104h, whenever the cylindrical extension 136R departs from the recess, i.e. upon last stage and more intensively upon completion of a piston stroke driving the plug 136 toward its foremost position.

In FIG. 1A the plugs 136 of both the valve of the right and the valve of the left filtration assemblies are in their rearmost position, such that both assemblies operate in filtration mode. Pressurized liquid enters the unit 100 through the inlet 181i of a main tube segment 181 of a T or a Y splitter 180 (commonly referred to also as Tee/Wye fitting). The liquid flow splits into the mirroring assemblies respectively through the lateral tube segments 181R and 181L and continues through the voids 103 of the valves and via the tubes 114 into the filtration chambers 110.

Passing through the disc filtration-elements 150, the respective two filtered liquid flows remerge through an outlet T or Y flow-combiner 190, and exit the unit 100 through the outlet 191e of the flow combiner 190.

An electronic controller (not illustrated) is configured to initiate backflush sessions for cleaning the filtration-elements 150, one at a time, on a periodic basis, upon a user's demand, or based on monitoring the operation of the unit 100, either in terms of the accumulating amount of filtered liquid measured since a previous flushing session, the amount of total operation hours past a previously carried cleaning session, or in terms of pressure levels falling under a predetermined threshold value that corresponds to a degree of filter clogging due to accumulated dirt.

Upon initiation of a cleaning session by the controller, the piston 134 is pushed (by a fluid forced into the control port 131 from an external pressurized source triggered by the controller) to drive the plug 136 forwardly toward the inlet opening 102a. Either simultaneously, with a predetermined delay, or with a pressure-dependent time delay, the disc filtration-element 150 is switched to its backflush operation mode. In some exemplary embodiments, the switch to backflush operation mode may be implemented using a change in the differential hydraulic pressure over a hydraulic switch of the filtration-element 150, resulting from the change in position of the plug 136 of the common valve (or e.g. in various other embodiments, by a fluid forced into its control port 155 from an external pressurized source triggered by the controller). Consequently, the disc cup 151 moves away from the discs thereby allowing them to separate for the cleaning. In some embodiments, the controller is programmed to delay switching the disc-filter 150 into a cleaning mode, until the inlet opening 102a is completely or nearly sealed by the plug 136. Such delay may be desired e.g. for ensuring the direction of flow through the filter is reversed when the discs are allowed undergo separation for the cleaning. In embodiments in which the disc-filter 150 is switched between the filtration mode of operation and the cleaning mode, a desired delay in the transition into cleaning mode may be achieved through appropriate design of the hydraulic actuator of the disc-filter and of the transition flows through the valve 136 during its transition from filtration position to reverse flow position. It is demonstrated by the dashed arrows in FIG. 1B that a reverse flow through the disc-filter 150 cannot be guaranteed as long as the inlet opening 102a of the valve in the filtration assembly undergoing the cleaning is widely open (even though not fully open). This is since the liquid pressure communicated from the external liquid source to the disc-filter 150 directly through tube segment 114 (of the filtration assembly undergoing the cleaning) may be greater than the same pressure communicated through the filtration chamber of the mirroring filtration assembly. The necessity of a delay between activation of the valve and activation of the disc-filter for cleaning, and its duration in case it is required, can be determined separately per each filtration project, and the controller can be programmed accordingly (and in various alternative embodiments the hydraulic actuator and the valve may be designed correspondingly), either based on experience gained in other projects, or based on in-site experimentation.

The convexity 136F in the front wall of the valve 136 speeds up reduction in the accessibility of the inlet opening 102a to the incoming flow during the last stages of the transition of the plug to its foremost position, thereby minimizing loss of liquid through the evacuation-port, accelerating reversal of the pressure over the disc-filter, and in turn allowing to shorten the delay and to switch the disc-filter into its cleaning mode more rapidly.

FIG. 1B exemplifies some stages during the transition state of the unit 100 from a filtration-only mode of operation to a cleaning mode of operation. The rear extension 136R off the plug 136 is depicted fully withdrawn from the recess 104h with a noticeable gap in between. At this stage liquid can freely escape from the valve's void 103 into the recess 104h as indicated by the small arrows near the rear extension 136R, and exit the left side unit 100 through the evacuation-outlet 103c and the evacuation tube segment 132. Escape of liquid from the void 103 to the evacuation-outlet 103c can start immediately after activation of the cleaning session and once the plug 136 leaves its rearmost hermetic sealing position, as a function involving the overlapping degree between the cylindrical wall of the rear-extension 136R and the inner cylindrical wall constituting the recess 104h, and as a function involving their mutual fit. For example, in some embodiments at least one of the cylindrical wall of the rear-extension 136R and the inner cylindrical wall of the recessed bushing 104 is provided with a gasket (such as ring gasket 137 near the rear end of the rear extension 136R of the plug, see FIG. 1D, and ring gasket 138 near the plug facing opening of the recessed bushing 104, see FIG. 1B), for sealing between the rear extension and the recess as long as the rear extension is not fully withdrawn from the recess. In some embodiments the gasket 137 of FIG. 1D may be sleeve-like, i.e. extend over a certain portion (up to 100%) of the length of the rear extension 136R. In embodiments implementing gasket/s for sealing the gap between the outer cylindrical wall of rear extension 136R and the inner cylindrical wall of the recess 104h, escape of liquid will start to occur only upon full (or nearly full) separation of the rear-extension from the recess. In other embodiments, said cylindrical walls may be configured to constantly have some small gap in between for minimizing or for completely avoiding a friction therebetween during transition of the plug from one mode of operation to another. In such embodiments, small leakage can start through the gap immediately upon separation of the plug 136 from its rearmost position, and then gradually yet insignificantly increase, in first stages of the transition as a result of the gradual withdrawal of the rear-extension 136R off the recess 104h, and in the mid stages of the transition as a result of the gradual increase in the separation between the recess 104h and the remoting rear-extension 136R. Since the cone-like protrusion 136R already penetrates through the inlet opening 102a during the mid and later stages of the transition state, the incoming flow is increasingly restricted, and the total waste of liquid remains small.

In various embodiments of the presently disclosed subject matter, the distance between a frontal end 136FF of the front protrusion 136F and a posterior end 136RR of the rear protrusion 136R, is equal to or greater than a distance between a frontal end of the recess 104h (which is the end of the recess 104h closer to the outer opening 102a) and the outer opening 102a. In some embodiments, said distance is greater than 80% of, yet shorter than, the distance between the frontal end of the recess and the outer opening 102a.

In some embodiments of the disclosed subject matter, at least for 50% of the full extent of linear movability of the plug between the first and second extreme positions, either the rear protrusion 136R occupies a volume of the recess or the front protrusion 136F penetrates through the outer opening 102a.

Experiments taken with embodiments implementing the solutions according to the presently disclosed subject matter revealed a significant decrease in the water wasted during typical automatic cleaning sessions, comparing to similar systems lacking the proposed solutions.

Effective flushing streams will occur during the steady state of the cleaning session, when the plug 136 is in its foremost position as exemplified by FIG. 1C. Since the valve opening 102a of the left filtration assembly is blocked by the respective plug 136, all the pressure of the supplied liquid will fall on the right filtration assembly, thereby increasing the flow rate through its filtration-element, while taking advantage of the increased diameter of the right tube-segment 181R (which is equal to the diameter of the inlet tube segment 181), of its moderated arching design, and of the uninterrupted bend-free flow channel along the entire liquid route between the inlet opening 102a and the filtration-element 150.

The liquid flow at the outlet of the left filtration chamber will thus, suffice for supplying effective reverse flow through the filtration chamber of the left assembly as required for the backflush, while continuing to supply filtered liquid to the main line, as resembled by the arrows illustrated in the flow combiner 190 (which functions as a flow splitter during cleaning sessions of the mirroring filtration assemblies).

In some embodiments of the disclosed subject matter, a backflush of both mirroring filtering assemblies may occur simultaneously either upon activation by a user or as a routine. In such embodiments the simultaneous backflush session will be activated by commanding both plugs 136 simultaneously to shut the inlet openings 102a, and by supplying reverse liquid flow into the combiner 190 through its exit 191e, from an external pressurized liquid source. The pressurized reverse liquid flow will diverge into the left and the right filtration-elements 150 through the arched segments 191L and 191R, respectively, once the rear extensions 136R of both plugs are withdrawn from their recesses 104h.

In some embodiments, the combiner 190 is integral to the bodies of the left and the right chamber's housings 110. In various embodiments, each housing 110 has an opened proximal end 112 (see FIG. 1E) facing the opened end 112 of its counterpart 110, and the housings 110 and the left and the right tube segments 191L and 191R of the combiner 190 are configured to be coupled, respectively, by a coupling clamp, thereby allowing the combiner to be secured to the unit 100 with a longitudinal axis of its central tube segment 191 angled to the plane of the figure at any desired angle (with the exception of angles in which its further rotation is blocked by the body of other components, e.g. by the body of the flow splitter 180).

In some embodiments, the flow splitter 180 is integral to the bodies of the left and the right valves 102. In various embodiments, the valves 102 and the left and the right tube segments 181L and 181R of the splitter 180 are configured to be coupled, respectively, by a coupling clamp, thereby allowing the splitter to be secured to the unit 100 with a longitudinal axis of its central tube segment 181 angled to the plane of the figure at any desired angle (with the exception of angles in which its further rotation is blocked by the body of other components, e.g. by the body of the flow combiner 190).

In various embodiments of the disclosed subject matter in which the splitter 180 and the combiner 190 are tilt-able and can thus be secured each facing a desired direction, the unit 100 becomes highly versatile and may be comfortably integrated into different mainline architectures, including but not limited to L, Z, I, and U relationships between the incoming and outgoing portions of the mainline (wherein the ends of the letter shapes are aligned with the longitudinal axes of the incoming and outgoing mainline portions).

In various embodiments of the disclosed subject matter either of the Y-splitter 180 and the Y-combiner 190 may further comprise at least one integral multipurpose port useful for removably connecting a desired accessory, for example air valve, pressure-gouge, turbidity sensor, auxiliary filter and so on.

The versatility gained by the provision of tilting capability between the single-piece unit 101 and either of the Y-splitter 180 and the Y-combiner 190, further facilitates piling together a plurality of mirroring units 100 into a compact and well organized battery of automatic backflush filtration units.

When the term "about" is associated with a stated dimension, size, count, measurement and the like, up to 10% deviation is concerned, unless explicitly stated otherwise.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A filtration system comprising: a filtration chamber, a filtration-element housed within the filtration chamber, wherein the filtration-element comprises a body of the filtration-element, a common valve comprising a valve housing in fluid communication with the filtration chamber, with a source of fluid to be filtered, and with evacuation port for backflush fluid, through three respective openings in the valve housing, wherein the common valve, the filtration chamber, and a tube segment connecting therebetween, are mutually configured to provide for an uninterrupted bend-free flow-channel extending at least from exteriorly to an inlet opening of the common valve, to the body of the filtration-element whenever the common valve is in a filtration mode of operation.

2. The filtration system according to claim 1, wherein the bend-free flow-channel has a cross section area perpendicularly to a longitudinal axis thereof of about 50% or more of the area of the inlet opening of the common valve.

3. The filtration system according to claim 1, wherein the common valve comprises a plug that is linearly movable within a central void of the common valve, wherein a backwall of the plug has a protrusion fitting within a matching immovable recess, wherein the matching immovable recess extends between an evacuation-outlet formed in a wall of the valve housing and between the central void and has an internal free space having a predetermined volume, wherein said protrusion is configured to at least partially occupy the internal free space when the plug is in transition, between a backmost position of the plug within the void and a position closer to a foremost position of the plug within the void until full departure of the protrusion out from within the immovable recess, thereby reducing evacuation of fluid through the immovable recess during transition of the plug between a filtration mode of operation and a backflush mode of operation as a function of a degree of a volume of the recess, occupied by the protrusion.

4. The filtration system according to claim 3, wherein the common valve comprises a plug that is linearly movable between a first position and a second position, wherein the first position is associated with a filtration mode of operation, wherein the second position is associated with a backflush mode of operation, wherein the plug comprises a rear protrusion configured to restrict fluid passage from a central void of the valve to the evacuation port during linear motion of the plug from the first position to the second position, wherein at least a portion of a predetermined volume of the recess is occupied by the rear protrusion for at least first 30% of full extent of the linear motion whereby waste of fluid through the evacuation port is reduced as a function of a degree of a volume of the recess occupied by the protrusion.

5. The filtration system according to claim 4, wherein the rear protrusion is cylindrical, a height of which is oriented parallel to a direction of the linear motion.

6. The filtration system according to claim 1, wherein the common valve comprises a plug that is linearly movable between a first position and a second position, wherein the first position is associated with a filtration mode of operation, wherein the second position is associated with a backflush mode of operation, wherein the plug comprises a front protrusion configured to enter the inlet opening for thereby reducing a flow rate of fluid into the inlet opening during linear motion of the plug from the first position to the second position, wherein at least a portion of the front protrusion penetrates through the inlet opening for at least last 30% of full extent of the linear motion, whereby waste of fluid through the evacuation port is reduced as a function of a degree of penetration of the front protrusion through the inlet opening.

7. The filtration system according to claim 6, wherein the front protrusion is conically like, tapering towards the inlet opening.

8. The filtration system according to claim 1, wherein an angle between a longitudinal axis of the tube segment and a longitudinal axis of the filtration chamber is between 35 and 55 degrees.

9. The filtration system according to claim 6, wherein the tube segment has an elliptically shaped cross section perpendicularly to its longitudinal axis, flattened in a direction parallel to the direction of linear motion, thereby allowing for a shortening the extent of linear motion of the plug per a given cross section area of the tube segment.

10. The filtration system according to claim 1, wherein a proximal end of the filtration chamber, at least most of the housing of the common valve and the tube segment are inseparable members of a single piece of material.

11. The filtration system according to claim 1, wherein a flow through a first opening in a housing of the filtration chamber is into the chamber during filtration mode of operation and out of the chamber during backflush mode of operation, wherein a flow through a second opening in a housing of the filtration chamber is out of the chamber during filtration mode of operation and into the chamber during backflush mode of operation.

12. A twin filtration system comprising a first and a second filtration systems, each according to claim 1, said first and second filtration systems are connected together in mirroring configuration, wherein the inlet opening of the common valve in the first system is facing the and having a line of sight with the inlet opening of the common valve in the second system through a flow splitter for a fluid to be filtered.

13. A twin filtration system according to claim 12, wherein the flow splitter comprises a pair of arched tubes diverging from a central common tube.

14. A twin filtration system comprising a first and a second filtration systems, each according to claim 1, said first and second filtration systems are connected together in mirroring configuration, wherein an outlet opening of the filtration chamber in the first system is facing the and having a line of sight with an outlet opening of the filtration chamber in the second system through a flow combiner for a filtered fluid.

15. The twin filtration system according to claim 14, wherein the flow combiner comprises a pair of arched tubes diverging from a central common tube.

16. The twin filtration system according to claim 15, wherein a radius of a largest inner curve of each of the arched tubes is between about 100% and 150% the diameter of the central common tube.

17. The twin filtration system according to claim 15, wherein an inner cross section area of the central common tube of the flow combiner is *about* equal *to* an inner cross section area of any one of the tubes diverging from the common central tube.

18. A valving device having a linearly movable plug for selecting between a first flow path and a second flow path corresponding to a first and a second extreme positions of the linearly movable plug, and constituting a common valve, the valving device comprises a housing, the plug that is linearly movable within the housing between said first and second extreme positions, a permanently-open port common to the first flow path and the second flow path, a first port having an outer opening in fluid communication with the permanently open port when the plug is in the first of the extreme positions, a second port having fluid communication with the permanently open port when the plug is in the second of the extreme positions, wherein when the plug is in the first of the extreme positions, fluid communication between the outer opening and the permanently open port comprises a linear flow-path having a [transvers] *transverse* cross section area greater than 50% the area of the outer opening, constituting an uninterrupted bend-free flow-channel extending [at least] from [exteriorly to] the outer opening to [exteriorly to] the permanently-open port.

19. The valving device according to claim 18, wherein [transvers] *transverse* cross section area of the linear flow-path is greater than 75% the area of the outer opening.

20. The valving device according to claim 18, wherein the permanently-open port has a predetermined open area in a plane, parallel to a linear direction of motion of the plug, wherein the open area has [a] *an ellipse shape having a minor axis and a major axis, the* minor axis defining a width of the [bidirectional] *permanently-open* port on the plane and [a] *the* major axis defining a length of the [bidirectional] *permanently-open* port on the plane, wherein the width is smaller than the length, wherein the minor axis and correspondingly the width of the [bidirectional] *permanently-open* port on the plane is parallel *or about parallel* to the direction of motion of the plug.

*21. The valving device according to claim 18, wherein a backwall of the plug has a protrusion fitting within a matching immovable recess, wherein the matching immovable recess extends between the second port and between a central void of the valving device, wherein said protrusion is configured to block flow of fluid from the central void to the second port when the plug is in transition between the first extreme position within the void and an intermediate position between the first extreme position and the second extreme position, wherein the first extreme position is associated with a filtration mode of operation of a self-cleaning filtration system, wherein the second extreme position is associated with a backflush mode of operation of the self-cleaning filtration system, thereby allowing to reduce evacuation of fluid during transition of the plug once configured to change a mode of operation from the filtration mode of operation to the backflush mode of operation.*

*22. The valving device according to claim 18, wherein the first of the extreme positions is associated with a filtration mode of operation of a self-cleaning filtration system, wherein the second of the extreme positions is associated with a backflush mode of operation of the self-cleaning filtration system, wherein the plug comprises a front protrusion configured to enter the outer opening for thereby reducing flow rate of fluid into the first port during linear motion of the plug from the first of the extreme positions to the second of the extreme positions, for at least last 30% of a full extent of a linear movability of the plug between the first and second extreme positions, whereby waste of fluid through the second port is reduced as a function of a degree of penetration of the front protrusion through the outer opening.*

*23. The valving device according to claim 18,*

*wherein a backwall of the plug has a protrusion substantially fitting within a matching immovable recess, wherein the matching immovable recess extends between the second port and between a central void of the valving device, wherein said protrusion is configured to block or substantially restrict flow of fluid from the central void to the second port when the plug is in transition between the first extreme position within the void and an intermediate position between the first extreme position and the second extreme position;*

*wherein the plug further comprises a front protrusion configured to enter the outer opening for thereby reducing flow rate of fluid into the first port during linear motion of the plug from the first extreme position to the second extreme position, for at least last 30% of a full extent of a linear movability of the plug between the first and second extreme positions; and*

*wherein the first extreme position is associated with a filtration mode of operation of a self-cleaning filtration system, wherein the second extreme position is associated with a backflush mode of operation of the self-cleaning filtration system, thereby allowing to reduce evacuation of fluid during transition of the plug once configured to change a mode of operation from the filtration mode of operation to the backflush mode of operation, as a function of a degree of a volume of the recess occupied by the rear protrusion and a degree of penetration of the front protrusion through the outer opening.*

*24. The valving device according to claim 23, wherein at least for 50% of the full extent of linear movability of the plug between the first and second extreme positions, either the rear protrusion occupies a volume of the recess or the front protrusion penetrates through the outer opening.*

*25. The valving device according to claim 23, wherein a distance between a frontal end of the front protrusion and a posterior end of the rear protrusion is greater than 80% a distance between a frontal end of the recess and the outer opening.*

*26. The valving device according to claim 23, wherein a distance between a frontal end of the front protrusion and a posterior end of the rear protrusion is equal to or greater than a distance between a frontal end of the recess and the outer opening.*

*27. The valving device according to claim 18, wherein the permanently open port is a bi-directional port, wherein fluid is configured to flow in a first direction with respect to the bi-directional port in the first flow path, wherein fluid is configured to flow in a second direction with respect to the bi-directional port in the second flow path, the first direction is an opposite direction to the second direction.*

*28. The filtration system according to claim 1, wherein the bend-free flow-channel has a cross section area perpendicularly to a longitudinal axis thereof of about 75% or more of the area of the inlet opening of the common valve.*

*29. The filtration system according to claim 1, wherein the bend-free flow-channel is implemented within said tube segment.*

*30. The filtration system according to claim 1, wherein the bend-free flow-channel provides a line of sight from the inlet opening to the filtration-element.*

*31. The filtration system according to claim 1 having a system inlet and a system outlet, the system inlet is connected to the source of fluid to be filtered, the system outlet is connected to the filtration-chamber, the filtration system is configured to enable passage of fluid from the system inlet via the filtration-element to the system outlet, wherein the fluid to be filtered passing through the filtration system from the system inlet to the system outlet, during the filtration mode of operation, is subject to no more than three turns.*

*32. The filtration system according to claim 1 having a system inlet, wherein the system inlet is connected to the source of fluid to be filtered, wherein the fluid to be filtered passing through the filtration system from the system inlet to filtration-chamber, during the filtration mode of operation, is subject to no more than a single turn.*

*33. The filtration system according to claim 1 having a system outlet, the system outlet is connected to the filtration-chamber, the filtration system is configured to enable passage of fluid from the filtration-element to the system outlet, wherein fluid filtered by the filtration-element and exiting the filtration-chamber to the system outlet, during the filtration mode of operation, is subject to no more than a single turn.*

*34. The filtration system according to claim 1, wherein the fluid is liquid.*

*35. The filtration system according to claim 1, wherein in the filtration mode of operation said common valve prevents fluid communication between the evacuation opening and between both the inlet opening and the outlet opening, wherein in the backflush mode of operation said common valve prevents fluid communication between inlet opening and between both the outlet opening and the evacuation opening.*

*36. The filtration system according to claim 1, wherein whenever the common valve is in the filtration mode of operation, fluid provided from the source of fluid to be filtered is configured to flow through the inlet opening of said common valve to the outlet opening of said common valve, whereby the fluid to be filtered flows through the uninterrupted bend-free flow-channel to the filtration-element.*

*37. The filtration system according to claim 1, wherein whenever the common valve is in the backflush mode of operation, fluid from the filtration chamber is configured to flow through the outlet opening of said common valve to the evacuation opening of said common valve.*

*38. The filtration system according to claim 1, wherein the backflush mode of operation and the filtration mode of operation use a shared portion of said tube segment.*

*39. The filtration system according to claim 1 comprising a filtration system member, the filtration system member comprising, in one inseparable piece, a portion of said filtration chamber, a portion of said valve housing and said tube segment connecting therebetween.*

*40. The filtration system according to claim 39, wherein the uninterrupted bend-free flow-channel is provided internally to said filtration system member.*

*41. The filtration system according to claim 39, wherein the filtration system member provides a line of sight between the inlet opening of the common valve to the outlet opening of the common valve, whereby providing the uninterrupted bend-free flow-channel.*

*42. The filtration system according to claim 1,*

*wherein the outlet opening is a bi-directional port;*

*wherein whenever the common valve is in the filtration mode of operation, fluid is configured to flow from the inlet opening of common valve to the filtration chamber via the bi-directional port, whereby causing filtration of the fluid to be filtered by the filtration-element during the filtration mode of operation; and*

*wherein whenever the common valve is in the backflush mode of operation, fluid is configured to flow from filtration chamber to the evacuation opening of the common valve via the bi-directional port, whereby enabling flushing of the filtration-element and evacuating dirty fluid utilized for cleaning the filtration-element.*

*43. The filtration system according to claim 1, wherein said tube segment having a longitudinal axis, wherein a cross-section area of the uninterrupted bend-free flow-channel that is measured transversely to the longitudinal axis and defined by parallel sightlines extending between the inlet opening and between the body of the filtration-element is 75% or more of a cross-section area of said tube segment.*

*44. A filtration system comprising:*

*a filtration chamber,*

*a filtration-element housed within the filtration chamber, wherein the filtration-element comprises a body of the filtration-element,*

*a common valve comprising a valve housing in fluid communication with the filtration chamber, with a source of fluid to be filtered, and with evacuation port for backflush fluid, through three respective openings in the valve housing, the three respective openings comprise an inlet opening an outlet opening and an evacuation opening, wherein the outlet opening is permanently open,*

*wherein the common valve comprises a plug that is movable within a central void of the common valve between a first position and a second position, wherein the first position is associated with a filtration mode of operation of the filtration system, wherein the second position is associated with a backflush mode of operation of the filtration system,*

*wherein the common valve, the filtration chamber, and a tube segment connecting therebetween, are mutually configured to provide for a linear flow-channel extending from the inlet opening of the common valve to the body of the filtration-element whenever the common valve is in the filtration mode of operation, wherein the linear flow-channel provides a sightline from an outer side of the inlet opening to the filtration-element.*

*45. The filtration system according to claim 44, wherein the linear flow-channel has a cross section area perpendicularly to a longitudinal axis thereof of about 50% or more of the area of the inlet opening of the common valve.*

*46. The filtration system according to claim 44, wherein the linear flow-channel has a transvers cross section area of that is greater than 75% the area of the inlet opening of the common valve.*

*47. The filtration system according to claim 44,*

*wherein the plug is linearly movable within the central void of the common valve,*

*wherein a backwall of the plug has a protrusion substantially fitting within a matching immovable recess,*

*wherein the matching immovable recess extends between the evacuation opening formed in a wall of the valve housing and between the central void and has an internal free space having a predetermined volume, wherein said protrusion is configured to at least partially occupy the internal free space when the plug is in transition, between a backmost position of the plug within the void and a position closer to a foremost position of the plug within the void until full departure of the protrusion out from within the immovable recess, thereby reducing evacuation of fluid through the immovable recess during transition of the plug between a filtration mode of operation and a backflush mode of operation as a function of a degree of a volume of the recess, occupied by the rear protrusion.*

*48. The filtration system according to claim 44, wherein the common valve comprises a plug is linearly movable between the first position and the second position.*

*49. The filtration system according to claim 48, wherein the plug comprises a rear protrusion configured to restrict fluid passage from the central void of the valve to the evacuation opening during linear motion of the plug from the first position to the second position, wherein at least a portion of a predetermined volume of the recess is occupied by the rear protrusion for at least first 30% of full extent of the linear motion whereby waste of fluid through the evacuation port is reduced as a function of a degree of a volume of the recess occupied by the rear protrusion.*

*50. The filtration system according to claim 49, wherein the rear protrusion is cylindrical, a height of which is oriented parallel to a direction of the linear motion.*

*51. The filtration system according to claim 44, wherein the plug that is linearly movable between the first position*

*and the second position, wherein the plug comprises a front protrusion configured to enter the inlet opening for thereby reducing a flow rate of fluid into the inlet opening during linear motion of the plug from the first position to the second position, wherein at least a portion of the front protrusion penetrates through the inlet opening for at least last 30% of full extent of the linear motion, whereby waste of fluid through the evacuation port is reduced as a function of a degree of penetration of the front protrusion through the inlet opening.*

*52. The filtration system according to claim 51, wherein the front protrusion is conically like, tapering towards the inlet opening.*

*53. The filtration system according to claim 44, wherein an angle between a longitudinal axis of the tube segment and a longitudinal axis of the filtration chamber is between 35 and 55 degrees.*

*54. The filtration system according to claim 44, wherein the tube segment has an elliptically shaped cross section perpendicularly to its longitudinal axis, flattened in a direction parallel to the direction of linear motion, thereby allowing for a shortening the extent of linear motion of the plug per a given cross section area of the tube segment.*

*55. The filtration system according to claim 44, wherein a proximal end of the filtration chamber, at least most of the housing of the common valve and the tube segment are inseparable members of a single piece of material.*

*56. The filtration system according to claim 44, wherein the outlet opening of the common valve has a predetermined open area in a plane, parallel to a linear direction of motion of the plug, wherein the open area has a minor axis defining a width of the outlet opening of the common valve on the plane and a major axis defining a length of the outlet opening of the common valve on the plane, wherein the width is smaller than the length, wherein the minor axis and correspondingly the width of the outlet opening on the plane is parallel or closely parallel to the direction of motion of the plug.*

*57. A twin filtration system comprising a first and a second filtration systems, each according to claim 44, said first and second filtration systems are connected together in mirroring configuration, wherein the twin filtration system comprises a flow splitter and a flow combiner, the flow splitter connects a fluid inlet of the twin filtration system with the inlet opening of the common valve in the first system and the inlet opening of the common valve in the second system, the flow combiner connects an outlet opening of the filtration chamber in the first system and an outlet opening of the filtration chamber in the second system with an outlet of the twin filtration system.*

*58. A twin filtration system according to claim 57, wherein the flow splitter comprises a pair of arched tubes diverging from a first central common tube, wherein the flow combiner comprises a pair of arched tubes diverging from a second central common tube.*

*59. The twin filtration system according to claim 58, wherein a radius of a largest inner curve of each of the arched tubes is between about 100% and 150% the diameter of the respective central common tube.*

*60. The twin filtration system according to claim 57, wherein an inner cross section area of a respective central common tube of the flow splitter or the flow combiner is closely equal to an inner cross section area of any one of the tubes diverging from the respective common central tube.*

*61. A filtration system member, comprising in one inseparable piece a portion of filtration chamber housing, a portion of a housing of a common valve located exteriorly to and remotely from the portion of filtration-chamber housing, and a tube segment connecting therebetween, wherein the portion of filtration chamber housing, the portion of a housing of the common valve, and the tube segment, are mutually configured to provide for a linear flow-channel extending at least from an inlet opening of the common valve, to interiorly of the portion of filtration chamber housing, wherein the linear flow-channel provides a sightline from an outer side of the inlet opening of the common valve to an interior of the portion of filtration chamber housing, wherein the common valve comprises a plug that is linearly moveable between a first position and a second position within the housing of the common valve.*

*62. A filtration system member, comprising in one inseparable piece a portion of filtration chamber housing, a portion of a housing of a common valve located exteriorly to and remotely from the portion of filtration-chamber housing, and a tube segment connecting therebetween, wherein the portion of filtration chamber housing, the portion of a housing of the common valve, and the tube segment, are mutually configured to provide for a linear flow-channel extending at least from an inlet opening of the common valve, to interiorly of the portion of filtration chamber housing, wherein the linear flow-channel provides a sightline from an outer side of the inlet opening of the common valve to an interior of the portion of filtration chamber housing, wherein said filtration system member is being part of a filtration system, the filtration system comprises a filtration element, the filtration element is housed, at least partially, within the portion of filtration chamber housing, wherein the linear flow-channel provides a sightline from the outer side of the inlet opening of the common valve to the filtration element.*

* * * * *